US 10,173,162 B2

(12) United States Patent
Appelo et al.

(10) Patent No.: US 10,173,162 B2
(45) Date of Patent: Jan. 8, 2019

(54) FABRIC FILTERS FOR FILTRATION SYSTEM AND METHOD

(71) Applicant: General Electric Technology GmbH, Baden (CH)

(72) Inventors: Per-Erik Albert Appelo, Knoxville, TN (US); Peter Folke Ivar Wieslander, Kronoberg (SE)

(73) Assignee: General Electric Technology GmbH, Baden (CH)

( * ) Notice: Subject to any disclaimer, the term of this patent is extended or adjusted under 35 U.S.C. 154(b) by 159 days.

(21) Appl. No.: 15/414,382

(22) Filed: Jan. 24, 2017

(65) Prior Publication Data

US 2018/0207570 A1 Jul. 26, 2018

(51) Int. Cl.
| | |
|---|---|
| *B01D 53/22* | (2006.01) |
| *B01D 46/02* | (2006.01) |
| *B01D 46/52* | (2006.01) |
| *B01D 46/00* | (2006.01) |
| *B01D 39/16* | (2006.01) |

(52) U.S. Cl.
CPC ......... *B01D 46/02* (2013.01); *B01D 39/1623* (2013.01); *B01D 46/0005* (2013.01); *B01D 46/521* (2013.01); *B01D 2239/1208* (2013.01)

(58) Field of Classification Search
CPC .. B01D 46/521; B01D 46/0005; B01D 46/02; B01D 39/1623; B01D 2239/1208
See application file for complete search history.

(56) References Cited

U.S. PATENT DOCUMENTS

| | | | | |
|---|---|---|---|---|
| 3,386,232 | A | * | 6/1968 | Gaines, Jr. ............. B01D 46/02 210/493.1 |
| 3,440,807 | A | * | 4/1969 | Gaines, Jr. ............. B01D 46/02 210/493.1 |
| 4,105,562 | A | | 8/1978 | Kaplan et al. |
| 4,559,138 | A | | 12/1985 | Harms |
| 4,609,465 | A | | 9/1986 | Miller |
| 6,203,591 | B1 | | 3/2001 | Clements et al. |
| 6,230,777 | B1 | * | 5/2001 | Hedlund ............... B01D 29/111 156/443 |

(Continued)

FOREIGN PATENT DOCUMENTS

| | | |
|---|---|---|
| GB | 2 070 971 | 9/1981 |
| WO | 2013177606 | 12/2013 |

OTHER PUBLICATIONS

"Consistent Lower Compliance Cost for Dynamic Environments", AQCS Product Solutions, Fabric Filters, ALSTOM 2015, 2 pages.

(Continued)

*Primary Examiner* — Anthony R Shumate
(74) *Attorney, Agent, or Firm* — Nixon & Vanderhye P.C.

(57) ABSTRACT

A fabric filter including a hollow elongated upper section having a fabric sleeve with a cross sectional shape which is circular, oval or rectangular; a hollow elongated lower section including a fabric sleeve having pleats extending along a length of the lower section and a bottom of the lower section is covered, wherein an internal cross sectional area of the lower section is smaller than an internal cross sectional area of the upper section, wherein while joined the upper section and the lower section define a chamber within the fabric sleeves extending the lengths of the upper section and the lower section and the chamber is open at an upper end of the upper section.

24 Claims, 4 Drawing Sheets

(56) References Cited

U.S. PATENT DOCUMENTS

| | | |
|---|---|---|
| 6,752,847 B2 | 6/2004 | Smithies |
| 7,341,616 B2 | 3/2008 | Taylor et al. |
| 7,374,796 B2 | 5/2008 | Smithies |
| 7,815,714 B2 | 10/2010 | Taylor et al. |
| 7,905,935 B2 | 3/2011 | Clements |
| 7,927,392 B2 | 4/2011 | Clements et al. |
| 2011/0265436 A1* | 11/2011 | Platt ................. B01D 46/10 55/493 |
| 2011/0278243 A1* | 11/2011 | Levy ................. C02F 1/001 210/808 |
| 2012/0324842 A1* | 12/2012 | Schumann ............ B01D 46/06 55/303 |
| 2013/0056428 A1* | 3/2013 | Levy ................. B01D 39/1623 210/806 |
| 2013/0125754 A1* | 5/2013 | Johnson .............. B01D 46/04 95/280 |
| 2015/0047507 A1* | 2/2015 | Fox .................. B01D 46/521 96/74 |
| 2015/0047508 A1* | 2/2015 | Sanocki .............. B01D 46/521 96/74 |
| 2015/0151233 A1* | 6/2015 | Johnson ............ B01D 46/0004 95/273 |
| 2015/0165362 A1 | 6/2015 | Canfield et al. |
| 2017/0368490 A1* | 12/2017 | Wall ................ B01D 46/0005 |

OTHER PUBLICATIONS

"Worldwide Pollution Control Association (WPCA)", Duke Energy Seminar, Sep. 3-5, 2008, 48 pages.
"Worldwide Pollution Control Association", WPCA-Duke Energy FF/HAPS Seminar Oct. 12-13, 2011, 105 pages.
International Search Report cited in PCT/EP2016/050940 completed Mar. 27, 2018.

* cited by examiner

FABRIC FILTERS FOR FILTRATION SYSTEM AND METHOD

BACKGROUND OF THE INVENTION

This invention relates generally to fabric filters for large industrial gas filtration systems and, particularly, relates to fabric filters hanging in a filtration housing.

Fabric filters have a fabric sleeve that capture particles in exhaust gases that pass through the filter. The particles collect on the outer surface of the sleeve. The gases, without the particles, flow up through the fabric sleeve and exit an upper opening of the fabric filter. Conventional fabric sleeves have pleats or a cylindrical outer surface, but not both.

SUMMARY OF THE INVENTION

A novel fabric filter has been invented and is disclosed here that comprises a hollow elongated upper section having a first fabric sleeve with a cross sectional shape which is circular, oval or rectangular and a hollow elongated lower section including a second fabric sleeve having pleats extending along the length of the lower section. The internal cross sectional area of the lower section is smaller than an internal cross sectional area of the upper section. The upper section and the lower section while joined define a chamber within the first and second fabric sleeves extending the lengths of the upper section and the lower section and the chamber is open at an upper end of the upper section of the fabric filter.

In another embodiment, the fabric filter may be for a filtration compartment wherein the fabric filter comprises: a hollow elongated upper section comprising a first fabric sleeve having a shape in cross section which is circular, oval or rectangular, wherein an open upper end of the upper section is configured to seat in an opening in an upper plate of the filtration compartment; a hollow elongated lower section comprising a second fabric sleeve having pleats, wherein while joined the upper section and the lower section define a chamber within the first and second fabric sleeves extend the lengths of the upper section and the lower section and the chamber is open at the open upper end of the upper section. Also, an internal cross sectional area of the lower section is smaller than an internal cross sectional area of the upper section.

DETAILED DESCRIPTION OF THE INVENTION

Figure 1:
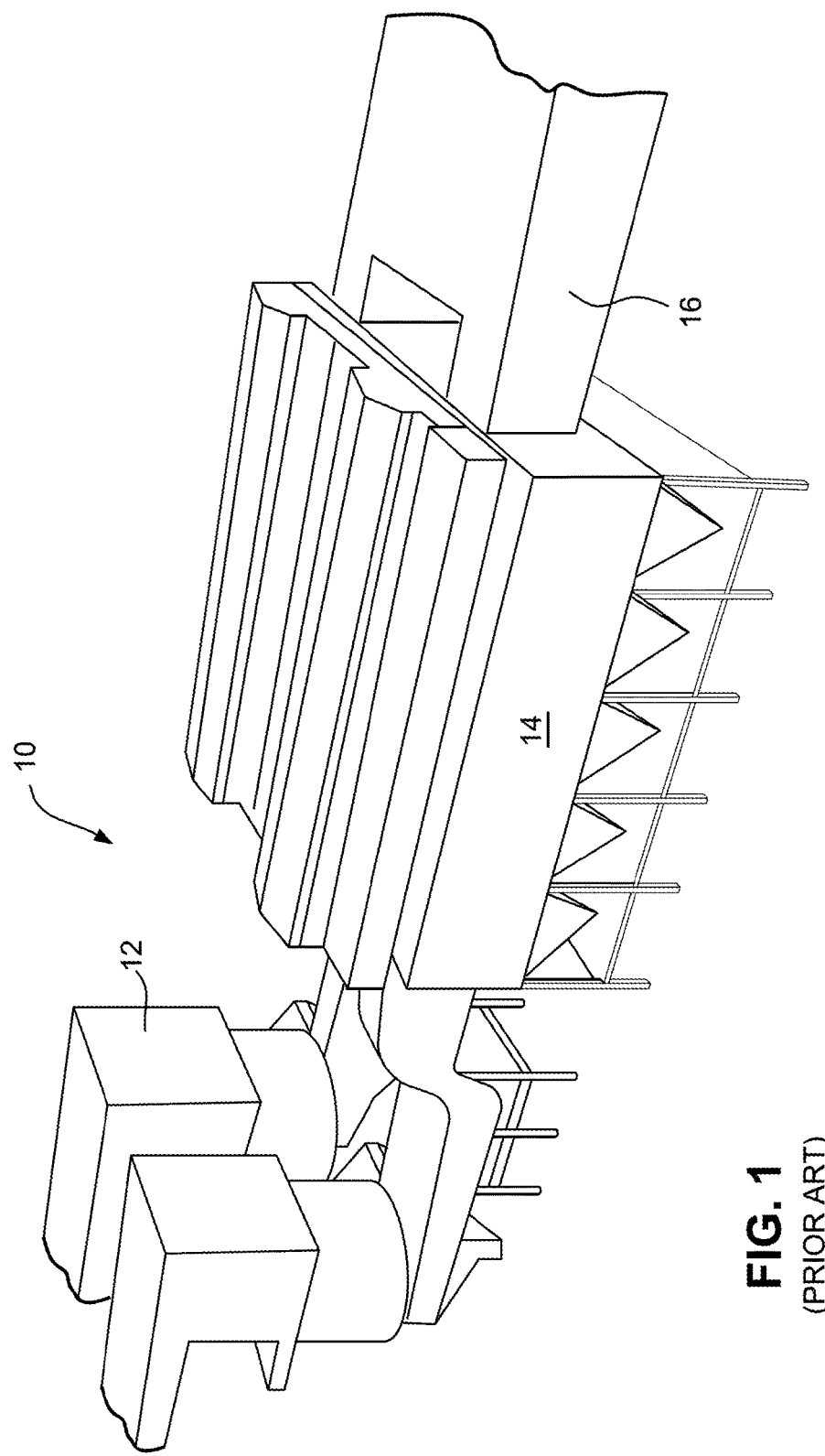
FIG. 1 shows a conventional gas filtration facility including a filtration housing.

FIG. 1 illustrates a conventional gas filtration facility 10 having ducts 12 that convey particles, e.g., dust, laded exhaust gas from a power generator to a gas filtration housing 14, also referred to as a bag house. The power generator may be a boiler that generates steam to power steam turbines, an incinerator or other power generation device that produces a particle laded exhaust gas. The gas filtration facility 10 may remove dust from gases produced by other industrial plants, such as steel mills, pharmaceutical producers, food manufacturers, chemical producers, asphalt plants and other industrial facilities. The separation of particles from the exhaust gas occurs in the gas filtration housing. Particle free gas flows from the filtration housing 14 to ducts 16 for further treatment of the gas.

Figure 2:
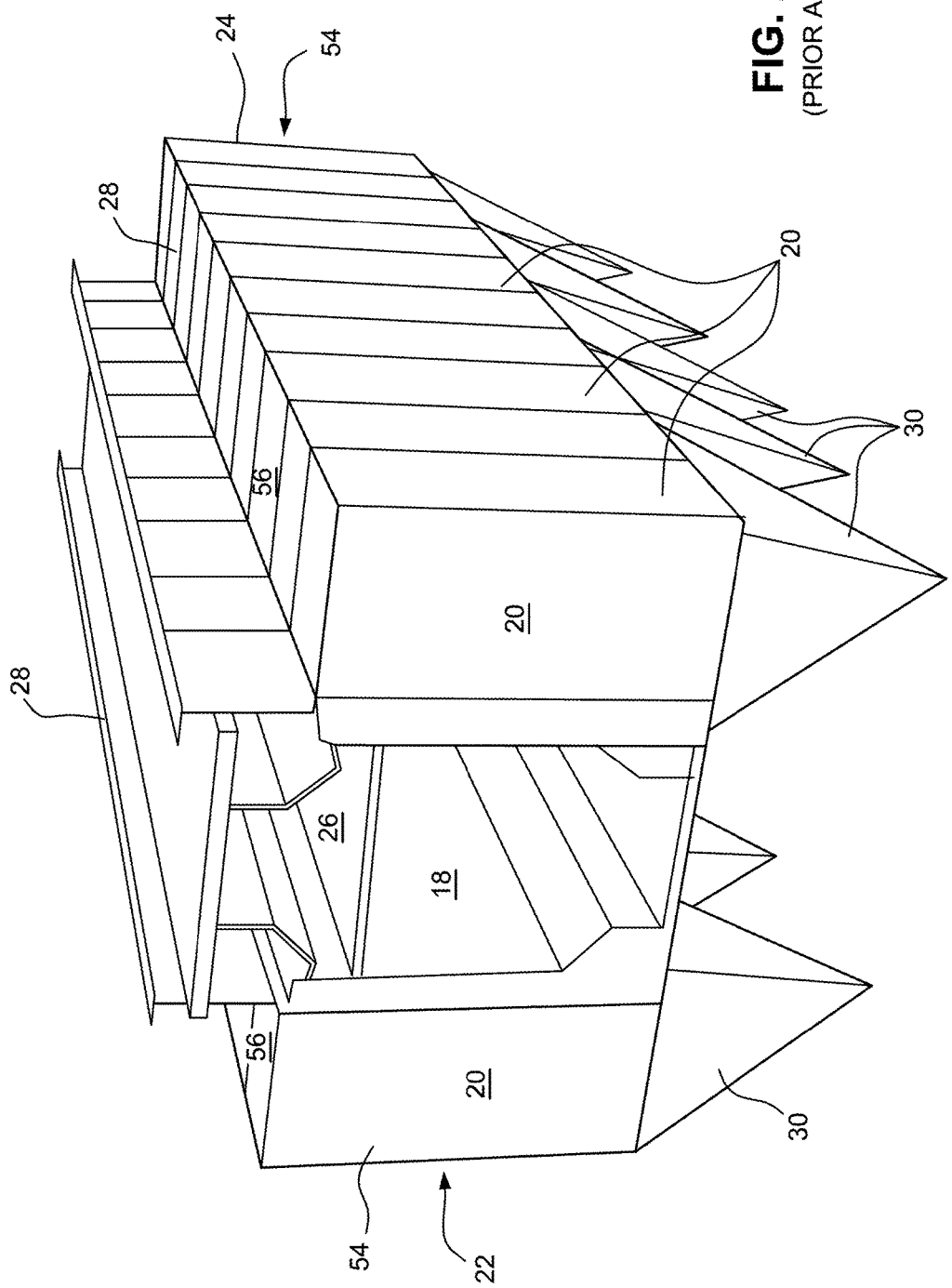
FIG. 2 is a perspective view of the end and side of the interior of a conventional filtration housing.

FIG. 2 is a perspective view of the end and side of the gas filtration housing 14 from which have been removed the walls of the housing. FIG. 2 shows the interior of the housing including a gas inlet passage 18, compartments 20 of fabric filters and dust hoppers 30 at the bottom of the compartments. The filtration house may also include a cleaning device 28 that periodically cleans the fabric filters to cause particles collected on the fabric filters to fall from the filters and into dust collection hoppers 30 at the bottom of the filtration compartments.

The gas inlet passage 18 distributes the particle laden gas to the fabric filters in compartments 20 on opposite sides of the inlet passage. The gas inlet passage 18 may extend through the center and along the length of the gas filtration housing. The gas inlet passage 18 may have a large cross section at the inlet end 22 of the filtration housing. The cross section of the inlet passage 18 may gradually taper along the length of the housing until the cross section is minimal at or near the opposite end 24 of the housing.

Particle laded gas flows through the gas inlet passage 18 and towards the compartments 20 of fabric filters. Ducts in the gas inlet passage 18 may direct the gas to a lower portion of the housing such that the particle laden gas enters from below the compartments 20 of the fabric filters.

The gas passes through the fabric of the fabric filters. Particles in the gas collect on the outer fabric surfaces of the fabric filters and gas enters the interior of the filters. The gas is cleaned by the separation of the particles from the gas by the fabric filters.

Clean gas flows through the interior of the fabric filters 40 and into a clean gas passage 26 in the gas filtration housing. The clean gas passage 26 may be in the center of the filtration housing, extend the length of the filtration housing and parallel to the gas inlet passage 18. The cross sectional area of the clean gas passage 26 may increase from the inlet end 22 of the filtration housing to the opposite end 24.

Figure 3:
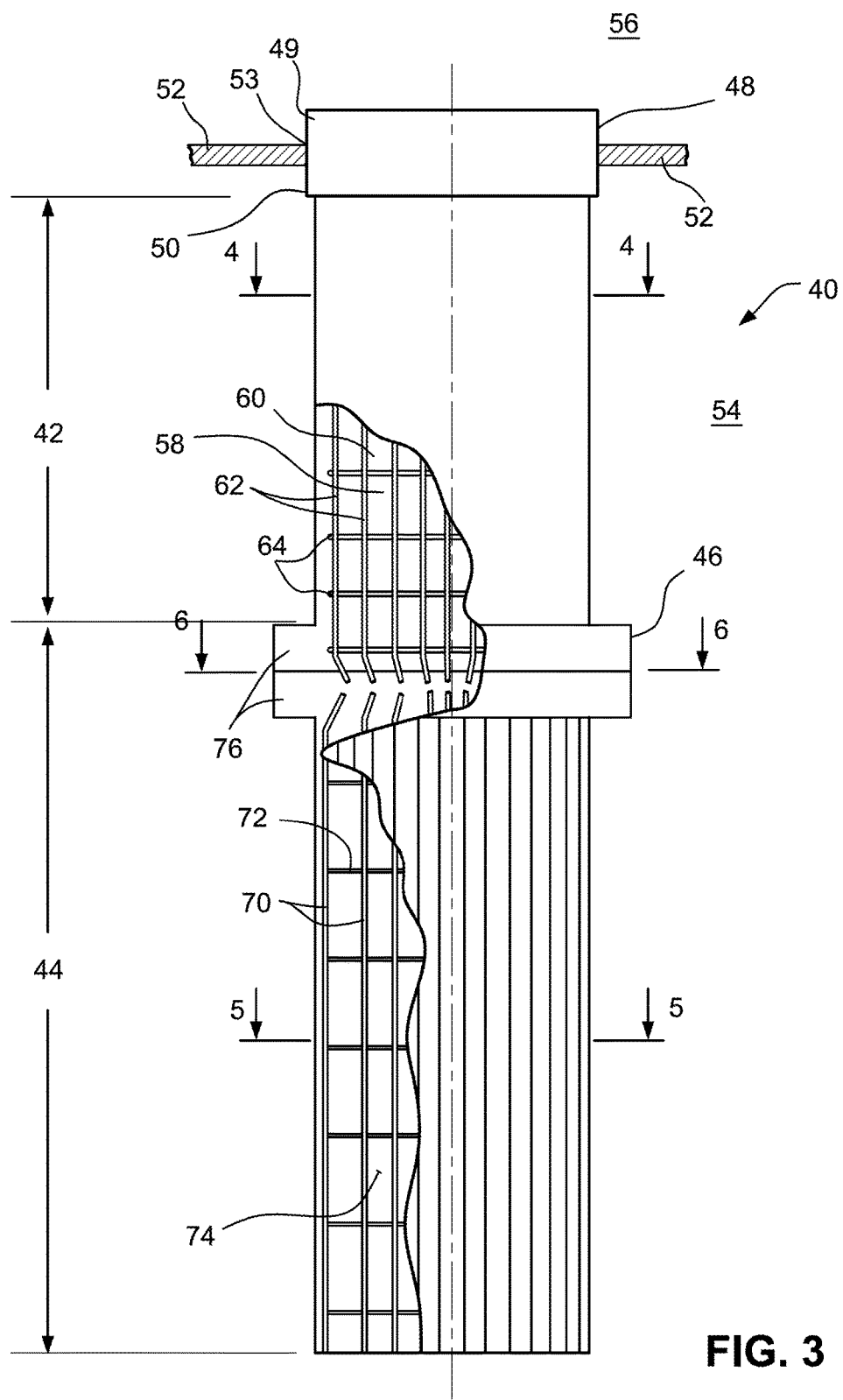
FIG. 3 is a side view of a fabric filter to be mounted in the filtration compartment.

FIG. 3 shows a novel fabric filter 40, also called a bag filter. The fabric includes an upper section 42 configured as a cylindrical fabric filter sleeve with a supporting cage, and a lower section 44 configured as a pleated fabric filter sleeve with a supporting cage. A coupling 46 connects the bottom of the upper section to the top of the lower section. The upper and lower sections may share the same vertical axis and thus be coaxial. A fabric skirt (not shown) may cover the outer surfaces of the coupling to prevent dust from seeping through the coupling and into the interior of the fabric filter.

The fabric filter 40, including upper section 42 and lower section 44, may include sleeves formed of woven or non-woven material (felt), such as polytetrafluoroethylene (PTFE), polyester, polypropylene, fiberglass and aramid. The porosity of the fabric of the upper and lower sections may be in a range of 0.5 micron to 20 micron or in a range of 0.5 to 1.0 microns. The fabric forming the upper and lower sections 42, 44 may be the same fabric or similar fabrics having substantially the same porosity.

An upper plate 52 separates the lower chamber 54 from an upper chamber 56 of each filter compartment 20. The upper plate 52 may be continuous across its respective compartment. The upper plates 52 form a barrier between the lower chamber 54 with the particle laden gas and the upper chamber 56 with the clean gas.

Openings 53 in the upper plate receive the fabric filters. The plate may have rows of openings 53 each configured to receive one of the fabric filters. The top end 48 of each fabric filter 40 is open and may include a collar 49 that seats on and attaches to an annular clamp 50 than holds the fabric filter to the upper plate 52.

The fabric filter 40 extends down from the opening in the upper plate 52 and into the lower chamber 54 of the filtration compartment. The particle laded gas moves through the lower chamber 54 and passes into the fabric filter 40. The interior of the fabric filter is hollow and forms an interior chamber 58 that is open to the upper chamber 56 of the filtration compartment. The interior chamber 58 is only open at the upper end and is otherwise covered by the fabric of the fabric filter.

As the gas passes through the fabric of the fabric filter 40, dust collects on the outer surface of the fabric and clean gas enters in the interior chamber 58. The gas moves up through the interior chamber 58 and exits the upper end of the fabric filter to enter the upper clean air chamber 56 of the filtration compartment. The fabric filter 40 is elongated in that its length, e.g., five to fifteen meters, is greater than its cross sectional diameter. The ratio of diameter to length may be in a range of 1 to 20 to 1 to 100. The respective lengths of the upper section 42 and the lower section 44 may be determined to achieve a desired flow resistance of gas flowing through the interior chamber 58 of the filter.

Figure 4:
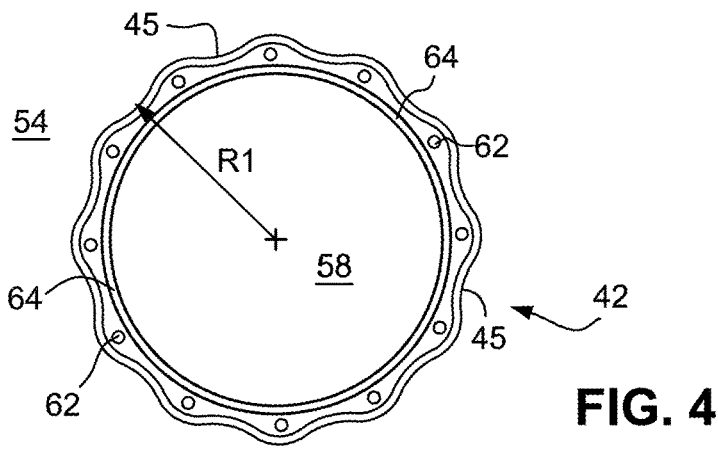
FIG. 4 shows in cross section of the fabric filter taken along line 4-4 of FIG. 3.

FIG. 4 shows the upper section 42 in cross section. The upper section 42 of the fabric filter comprises a fabric sleeve 45 arranged as a cylinder and has a circular cross section. The upper section may have a shape in cross section that is circular, oval, rectangular, racetrack or other curvilinear shape.

The circumference of the fabric times the length of the upper section 42 represents the surface area of the upper section. The surface area is the area of the upper section exposed to the particle laden exhaust and which filters the air. The greater the surface of the upper section the greater the filtering surface.

The fabric sleeve 45 of the upper section 42 may be supported by a cage 60 in the interior chamber 58 and extending the length of the upper section. The cage may be generally cylindrical with rods 62 extending vertically and hoops 64 oriented horizontally and supporting the rods at various elevations of the rods. Alternatively, the cage may be integrated within the fabric such as by including ribs in the fabric or other devices that hold the fabric of the filter in a generally uniform shape in cross section.

Figure 5:
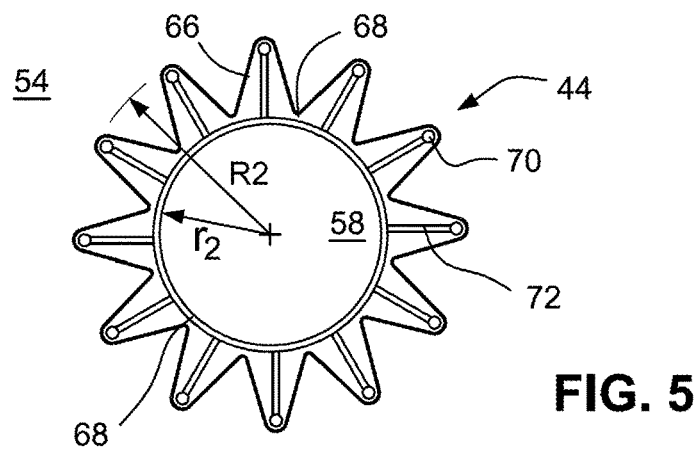
FIG. 5 shows in cross section the fabric filter taken along line 5-5 in FIG. 3.

FIG. 5 shows the lower section 44 of the fabric filter in cross section. The lower section is pleated as indicated by the star shaped pattern of the cross section of the lower section. The fabric sleeve 66 of the lower section forms fingers extending from an inner radius $r_2$ to an outer radius $R_2$. By extending back and forth between the two radii ($r_2$ and $R_2$), the length of the perimeter of the lower section is increased as compared to the perimeter of the circular cross section of the upper section. A rough calculation of the length of the perimeter of the cross section is twice the difference of the radii (r2 and R2) times the number of fingers. The length of the perimeter increases with the larger the difference in the radii and the higher the number of fingers.

The perimeter of the pleated lower section 44 may be 1.5, 2 (twice), 2.5, 3 or more times the perimeter of the upper section 42. Because of the longer perimeter, the surface area per unit of length of the filter fabric on the lower section is substantially greater than the surface area per unit of length of the filter fabric on the upper section. The greater surface area of the pleated lower section increases the surface area for exhaust gas to pass through and the surface area that can collect particles from the exhaust gas. By increasing the surface area of the pleated lower section 44 the resistance is lowered to the exhaust gas entering the lower section. Thus, the large surface area of the pleated fiber is effective at allowing exhaust gas to pass through the fabric of the filter with minimal pressure loss across the fabric and at providing a large surface are to collect particles from the exhaust gas.

The upper section 42 and the lower section 44 may (but need not) have similar lengths, such as within ten to twenty percent. The length of the lower section may be 2 meters (m) to 5 m. The upper section may have a length of at least one meter. The upper section may have a length of 20% to 90% of the total length of the fabric filter.

The interior chamber 58 of the pleated lower section 44 has a smaller cross sectional area than does the cylindrical upper section 42. The internal cross sectional area of the lower section may be one half or less the internal cross sectional of the upper section. This smaller cross sectional area of the interior of the lower section 44 could restrict the flow of cleaned gas and increase the pressure loss in the interior chamber, especially if the gas flow becomes too great or the length of the lower section becomes too long.

The increased cross sectional area of the interior chamber 58 in the upper section 42 provides ample area to pass the cleaned gas from both the lower section and the gas entering the interior chamber through the fabric sleeve 45 in the upper section. The larger interior cross sectional area of the upper section is better suited to pass the increased volume of cleaned gas flow in the upper section as compared to the smaller interior cross section of the lower section. By limiting the pleated section of the fabric filter to the lower section 44 and providing a cylindrical section in the upper section 42, the fabric filter can achieve the benefit of the larger surface area of a pleated fabric without the disadvantage of a small cross section in the interior chamber in the upper section of the fabric filter.

The fabric sleeve 66 of the lower section 44 may be supported by a cage 74 that includes inner hoops 68 at different elevations and rods 70 extending the length of the lower section. The rods 70 extending the length of the lower section, are at the outer corners of each of the pleats. The rods 70 support the outer corners of the pleats in the fabric. There may be one rod 70 for each pleat, for example there may be four (4) to sixteen (16), or more typically eight (8) to twelve (12), rods and pleats in the fabric. The hoops 68 are adjacent the inner corners of the pleats. The inner corners of the pleats may be tied or otherwise fastened to the hoops 68. The fabric sleeve covers the rods 70 and hoops 68. The diameter of the hoops 68 may be the inner radius $r_2$ of the hollow portion of the lower section of the fabric sleeve. Support fingers 72 extend from the hoops 68 radially out to the rods 70.

Figure 6:
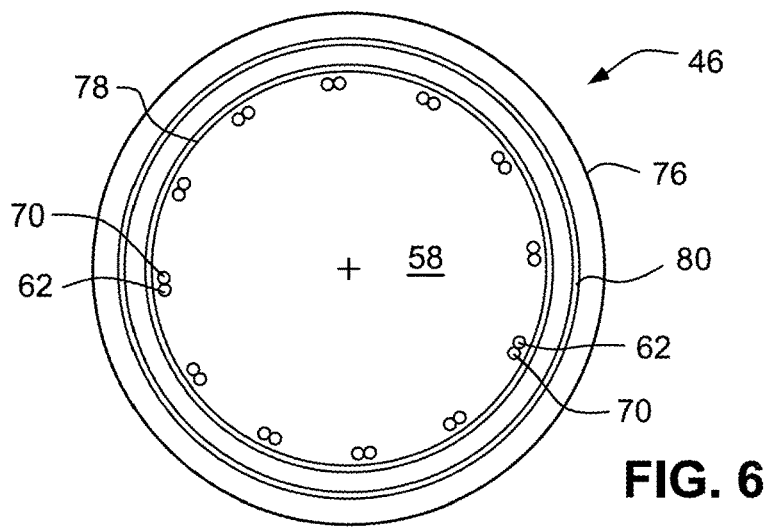
FIG. 6 shows a cross section a coupling for connecting the upper section to the lower section of the fabric filter taken along line 6-6 in FIG. 3.

FIG. 6 shows in cross section a coupling 46 for connecting the upper section to the lower section of the fabric filter. The coupling 46 may be a pair of annular rings 76 each attached to one of the upper and lower sections 42, 44 of the fabric filter. Each annular ring 76 may attach to an open end of the fabric filter to form a seal between the ring and the fabric. The rings may be joined by matching threads, mating slots and flanges, buckles or other fastening devices 78 to join the annular rings. A sealing ring 80 on at least one of the opposing faces of rings 78 may assist in forming a seal between the rings and the upper and lower sections 42, 44 of the fabric filter. The bottom portion includes a transition from round to pleated, similar to existing pleated designs for fabric filters, a substantially pleated filter media section and the bottom cuff.

As an alternative to the coupling 46, the upper edge of the pleated fabric sleeve of the lower section may be stitched or otherwise joined to a lower edge of the cylindrical fabric sleeve of the upper section. A reinforcement fabric layer strip, of a quality equal or better than the overall fabric sleeve quality, may be added circumferentially at the stitching joining the sleeves. The reinforcement fabric layer strip may be applied to protect the stitching or splicing joining the fabric sleeves.

The cage 60 for the upper section and the cage 74 for the lower section are connected at or at a distance from the coupling 46 or joint between the sections. The cages provide the structural support for the fabric filter. By joining the cages, the cage for the lower section is supported by the cage of the upper section. The cages may be joined by the upper ends of the rods 70 in the lower section 44 connecting to the lower ends of the rods 62 in the upper section 42. The connection may be the ends of rods having loops and hooks that interlock. Alternatively, the cage for the upper and lower sections may be formed as a single cage.

The fabric filter may have a generally uniform diameter (2R) along its length, including the lengths of the upper section 42 and the lower section 44. Maintaining a uniform diameter throughout the length of the fabric filter 40, particularly along the upper section and the pleated lower section, allows the fabric filters to be positioned close to each other so that the fabric filters fill much of the volume of the lower chamber 54 of the filtration compartment. The diameter of the fabric filter may vary by no more than 5%, 10% or 15% along the length of the filter.

If the pleated lower section had, for example, a greater diameter than the upper section, the gap between adjacent fabric filters in the lower chamber would be relatively great at the smaller diameter upper sections of the filters. The large gap represents space in the lower chamber that is not used to filter gases. By giving the filters a common outer diameter or common outer dimension, the filters can be arranged close together along their entire lengths.

Alternatively, the fabric filter may have a generally uniform diameter (2R) along its upper section 42 length and a conical or tapered shape of its lower section 44 length. A uniform diameter of the upper section length of the fabric filter 40 allows the fabric filters to be positioned close to each other so that the fabric filters fill much of the volume of the lower chamber 54 of the filtration compartment. A conical or tapered shape of the lower pleated fabric section may be beneficial, such as when the particle laden gas enters the filter compartments 20 from below.

The novel fabric filter is also advantageous if the cleaning device 28 applies compressed air pulses down the interior chamber 58 of the fabric filters. The large diameter and cylindrical upper interior chamber 58 in the upper section allows air pressure pulses to flow downward through the fabric filter with less resistance that would a pleated fabric on the upper section. By allowing the air pressure pulses to flow down the upper section with minimal resistance, the pressure pulses can penetrate and flow down to the bottom of the lower section that is pleated. Similarly, if the filter compartment is designed for gravimetric flow this fabric filter design will promote transport of particulate matter from the upper portion of the fabric filter to the bottom portion, which is particularly important for applications with low density, fine particulate matter.

The novel fabric filter disclosed herein may be embodied to have one or more of the following advantages as compared to pleated filters: over-all lower pressure drop through the filter, longer cleaning cycle times, lower compressed air consumption, longer filters, higher gas flow capacity and less risk for dust bridging. As compared to an entirely cylindrical fabric filter, the invention may have lower particulate matter emission due to the use of pleats in the lower section of the filter.

Because pleated fabric sleeves tend to be more expensive, a filter that has a cylindrical upper section may be less expensive than an entirely pleated fabric filter. Further the air to fabric (cloth) ratio (A/C) of the pleated lower section may be higher than the A/C ratio of an entirely pleated fabric filter because the pleating need not accommodate (and does not extend to) the larger gasflow portion of the upper section of the fabric filter.

The novel fabric filter has a flexible design that can be configured to satisfy various requirements for filtration, pressure loss through the filter and dimensions (both cross section and length). Because of this flexibility, the novel fabric filter may be used to provide pleated fabric filters (at least at the lower section) that can be retrofitted into existing filtration compartments and replace conventional cylindrical fabric filters.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fabric filter comprising:
    a hollow elongated upper section comprising a first fabric sleeve having a shape in cross section which is circular, oval or rectangular;
    a hollow elongated lower section comprising a second fabric sleeve having pleats extending lengthwise along the lower section, and a bottom of the lower section which is covered, and
    wherein while joined, the upper section and the lower section define a chamber within the fabric sleeves extending the lengths of the upper section and the lower section and the chamber is open at an upper end of the upper section.

2. The fabric filter of claim 1 wherein a coupling joins a lower end of the upper section to an upper end of the lower section.

3. The fabric filter of claim 1 wherein a perimeter of a cross section of the lower section is at least one and one-half times longer than a perimeter of a cross section of the upper section.

4. The fabric filter of claim 1 wherein the fabric filter of the upper section is devoid of pleats.

5. The fabric filter of claim 1 wherein the internal cross sectional area of the lower section is less than one-half of the internal cross sectional area of the upper section.

6. The fabric filter of claim 1 wherein a length of the upper section is twenty to ninety percent of a total length the fabric filter.

7. The fabric filter of claim 1 wherein an outer diameter of the lower section is within 90 to 110 percent of an outer diameter of the upper section.

8. The fabric filter of claim 7 wherein the outer diameter of the lower section equals the outer diameter of the upper section.

9. The fabric filter of claim 1 wherein outer diameters of the upper and lower sections are constant along the respective lengths of the upper and lower sections.

10. The fabric filter of claim 1 wherein an outer diameter of the upper section is constant diameter along the length of the upper section, and the lower section tapers along its length in a downward direction.

11. The fabric filter of claim 1 wherein the first fabric sleeve is supported by an elongated upper cage and the second fabric sleeve is supported by an elongated lower cage, and the upper and lower cages couple together.

12. The fabric filter of claim 1 wherein the first fabric sleeve and the second fabric sleeve are supported by a single elongated cage.

13. A fabric filter for a filtration compartment, the fabric filter comprising:
a hollow elongated upper section comprising a first fabric sleeve having a shape in cross section which is circular, oval or rectangular;
an open upper end of the upper section configured to seat in and attach to an opening in an upper plate of the filtration compartment, wherein the upper section is configured to hang from the upper plate down into the filtration compartment;
a hollow elongated lower section comprising a second fabric sleeve having pleats extending a length of the lower section and a bottom of the lower section covered by the second fabric sleeve,
wherein an internal cross sectional area of the second fabric sleeve is smaller than an internal cross sectional area of the first fabric sleeve, and
wherein the upper section and the lower section define a chamber within the first and second fabric sleeves extending the lengths of the upper section and the lower section, and the chamber is open at an upper end of the upper section.

14. The fabric filter of claim 13 wherein a coupling joins a lower end of the upper section to an upper end of the lower section.

15. The fabric filter of claim 13 wherein a perimeter of a cross section of the lower section is at least one and one-half times longer than a perimeter of a cross section of the upper section.

16. The fabric filter of claim 13 wherein the fabric filter of the upper section is devoid of pleats.

17. The fabric filter of claim 13 wherein the internal cross sectional area of the lower section is less than one-half of the internal cross sectional area of the upper section.

18. The fabric filter of claim 13 wherein a length of the upper section is twenty to ninety percent of a total length of the fabric filter.

19. The fabric filter of claim 13 wherein an outer diameter of the first fabric sleeve equals an outer diameter of the second fabric sleeve.

20. The fabric filter of claim 19 wherein the outer diameters of the first and second fabric sleeves are constant along the respective lengths of the upper and lower sections.

21. The fabric filter of claim 13 wherein an outer diameter of the upper section is constant along the length of the upper section, and the lower section has a cross section that tapers, in a downward direction, along the length of the lower section.

22. The fabric filter of claim 13 wherein the first fabric sleeve is supported by an elongated upper cage and the fabric sleeve of the second fabric sleeve is supported by an elongated lower cage, and the upper and lower cages couple together at their opposite edges.

23. The fabric filter of claim 13 wherein the first fabric sleeve and the second fabric sleeve are supported by a single elongated cage.

24. The fabric filter of claim 13 wherein the upper section is coaxial and shares a common vertical axis with the lower section.

* * * * *